(12) United States Patent
Wang et al.

(10) Patent No.: US 11,704,492 B2
(45) Date of Patent: Jul. 18, 2023

(54) METHOD, ELECTRONIC DEVICE, AND STORAGE MEDIUM FOR ENTITY LINKING BY DETERMINING A LINKING PROBABILITY BASED ON SPLICING OF EMBEDDING VECTORS OF A TARGET AND A REFERENCE TEXT

(71) Applicant: Beijing Baidu Netcom Science and Technology Co., Ltd., Beijing (CN)

(72) Inventors: Qi Wang, Beijing (CN); Zhifan Feng, Beijing (CN); Zhijie Liu, Beijing (CN); Siqi Wang, Beijing (CN); Chunguang Chai, Beijing (CN); Yong Zhu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 101 days.

(21) Appl. No.: 17/213,927

(22) Filed: Mar. 26, 2021

(65) Prior Publication Data
US 2021/0216716 A1    Jul. 15, 2021

(30) Foreign Application Priority Data
Apr. 23, 2020   (CN) .......................... 202010326675.0

(51) Int. Cl.
*G06F 40/295* (2020.01)
*G06F 16/36* (2019.01)
(Continued)

(52) U.S. Cl.
CPC ........ *G06F 40/295* (2020.01); *G06F 16/3344* (2019.01); *G06F 40/30* (2020.01)

(58) Field of Classification Search
CPC ... G06F 16/367; G06F 16/374; G06N 3/0445; G06N 3/0454; G06N 3/049; G06N 3/08
See application file for complete search history.

(56) References Cited

U.S. PATENT DOCUMENTS

2017/0262412 A1   9/2017 Liang et al.
2018/0225576 A1   8/2018 Pappu et al.
(Continued)

FOREIGN PATENT DOCUMENTS

CN   105224648 A    1/2016
CN   105976056   *  9/2016
(Continued)

OTHER PUBLICATIONS

Korean Office Action dated Jun. 30, 2022, in KR Application No. 10-2021-0038105, no English translation [ISGTP028].
(Continued)

*Primary Examiner* — Farzad Kazeminezhad
(74) *Attorney, Agent, or Firm* — Weaver Austin Villeneuve & Sampson LLP (57) ABSTRACT

A method, apparatus, device, and storage medium for entity linking is disclosed. The method includes: acquiring a target text; determining at least one entity mention included in the target text; determining a candidate entity corresponding to each of the entity mention based on a preset knowledge base; determining a reference text of each of the candidate entity and determining additional feature information of each of the candidate entity; and determining an entity linking result based on the target text, each of the reference text, and each piece of the additional feature information, wherein determining the entity linking result includes determining a probability of linking each of the candidate entity to the entity mention based on a splicing of a first embedding vector and a second embedding vector of the target text and a splicing of a first embedding vector and a second embedding vector of each respective reference text.

16 Claims, 7 Drawing Sheets

(51) Int. Cl.
*G06Q 10/04* (2023.01)
*G06F 16/33* (2019.01)
*G06F 40/30* (2020.01)

(56) References Cited

U.S. PATENT DOCUMENTS

| | | | |
|---|---|---|---|
| 2018/0232443 | A1 | 8/2018 | Delgo et al. |
| 2019/0220749 | A1 | 7/2019 | Feng et al. |

FOREIGN PATENT DOCUMENTS

| | | | |
|---|---|---|---|
| CN | 107092605 | A | 8/2017 |
| CN | 110147421 | A | 8/2019 |
| CN | 110275966 | A | 9/2019 |
| CN | 110569496 | A | 12/2019 |
| CN | 111428443 | B * | 4/2020 |
| IN | WO 2019/229769 | * | 12/2019 |
| JP | 2003108569 | A | 4/2003 |
| JP | 2008033931 | A | 2/2008 |
| JP | 2017123168 | A | 7/2017 |
| JP | 2018180866 | A | 11/2018 |
| WO | WO-2016210203 | A1 | 12/2016 |

OTHER PUBLICATIONS

European Search Report dated Sep. 17, 2021 issued EP Application No. 211656061.

Korean Office Action dated Jan. 31, 2023 in KR Application No. 10-2021-0038105 with English translation [ISGTP028].

Ma, C., et al., "Chinese Social Media Entity Linking Based on Effective Context with Topic Semantics", IEEE 43rd Annual Computer Software and Applications Conference (COMPSAC), pp. 386-395.

Guo, Y., et al., "Research on Context-based Entity Linking Technique", Dissertation for the Doctoral Degree in Engineering, Jul. 2014, pp. 98.

* cited by examiner

METHOD, ELECTRONIC DEVICE, AND STORAGE MEDIUM FOR ENTITY LINKING BY DETERMINING A LINKING PROBABILITY BASED ON SPLICING OF EMBEDDING VECTORS OF A TARGET AND A REFERENCE TEXT

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates to the field of computer technology, specifically to the field of knowledge graph, and more specifically to a method, apparatus, device, and storage medium for entity linking.

BACKGROUND

In order to make a machine better understand a text, the machine often needs to recognize entities in the text, and correspond the entities in the text to entities in a corresponding knowledge base one by one. There tend to be many homonymous entities in the knowledge base, and entity linking is required. Entity linking can play a positive role in contributing to many natural language processing and information retrieval tasks. Entity linking generally includes named entity recognition and named entity disambiguation.

An existing entity linking solution includes an entity linking technology based on supervised learning and an entity linking technology based on deep learning. Both of the two technologies rely on feature engineering and a training sample constructing process, and are labor-consuming.

SUMMARY

The present disclosure provides a method, apparatus, device, and storage medium for entity linking.

According to a first aspect, a method for entity linking is provided, including: acquiring a target text; determining at least one entity mention included in the target text; determining a candidate entity corresponding to each of the entity mention based on a preset knowledge base; determining a reference text of each of the candidate entity and determining additional feature information of each of the candidate entity; and determining an entity linking result based on the target text, each of the reference text, and each piece of the additional feature information.

According to a second aspect, an apparatus for entity linking is provided, including: a target text acquiring unit configured to acquire a target text; an entity mention determining unit configured to determine at least one entity mention included in the target text; a candidate entity determining unit configured to determine a candidate entity corresponding to each of the entity mention based on a preset knowledge base; an additional information determining unit configured to determine a reference text of each of the candidate entity and determine additional feature information of each of the candidate entity; and an entity linking determining unit configured to determine an entity linking result based on the target text, each of the reference text, and each piece of the additional feature information.

According to a third aspect, an electronic device is provided, including: at least one processor; and a memory communicatively connected to the at least one processor; where the memory stores instructions executable by the at least one processor, and the instructions are executed by the at least one processor, such that the at least one processor can execute the method according to the first aspect.

According to a fourth aspect, a non-transient computer-readable storage medium storing computer instructions is provided, where the computer instructions are used for causing a computer to execute the method according to the first aspect.

The technology according to the present disclosure can provide external knowledge during entity linking, and actively play a role in knowledge driving, thereby improving the accuracy rate of entity linking, and meeting the application requirements in complex scenarios.

It should be understood that contents described in the SUMMARY are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for better understanding of the present solution, and do not impose a limitation on the present disclosure. In the figures.

DETAILED DESCRIPTION OF EMBODIMENTS

Example embodiments of the present disclosure are described below with reference to the accompanying drawings, including various details of the embodiments of the present disclosure to contribute to understanding, which should be considered merely as examples. Therefore, those of ordinary skills in the art should realize that various alterations and modifications can be made to the embodiments described here without departing from the scope and spirit of the present disclosure. Similarly, for clearness and conciseness, descriptions of well-known functions and structures are omitted in the following description.

It should be noted that the embodiments in the present disclosure and the features in the embodiments may be combined with each other on a non-conflict basis. The present disclosure will be described in detail below with reference to the accompanying drawings and in combination with the embodiments.

Figure 1:
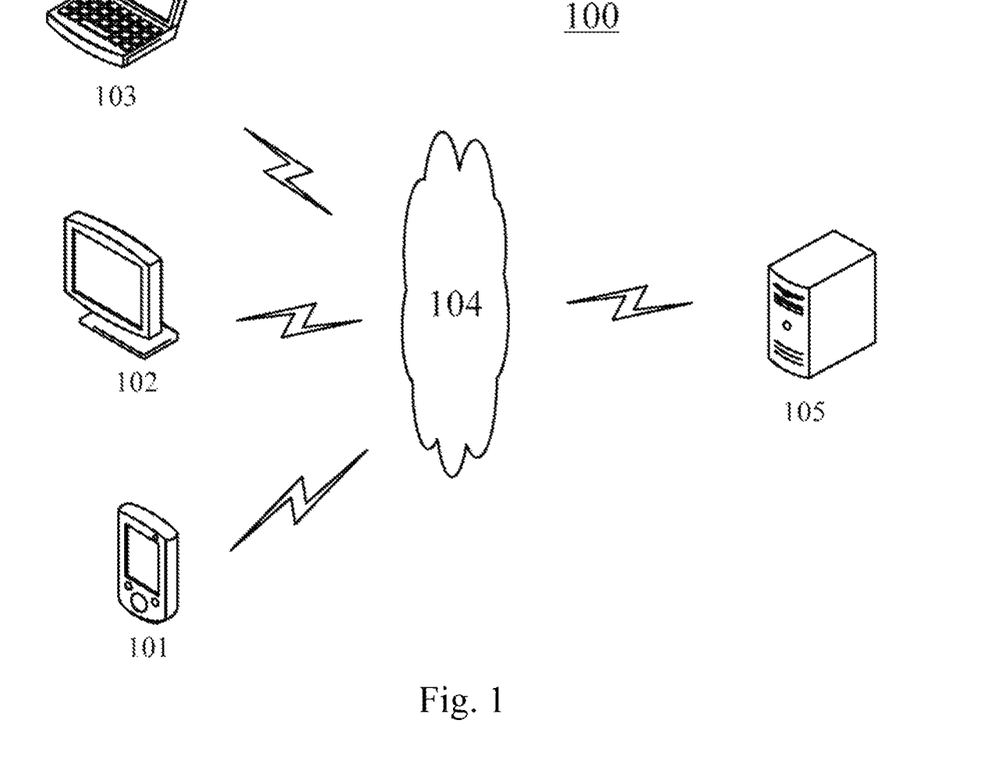
FIG. 1 is a diagram of an example system architecture in which an embodiment of the present disclosure may be implemented.

FIG. 1 shows an example system architecture 100 in which a method for entity linking or an apparatus for entity linking of embodiments of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, e.g., to receive or send a message. The terminal devices 101, 102, and 103 may be provided with various communication client applications, such as a retrieval application.

The terminal devices 101, 102, and 103 may be hardware, or may be software. When the terminal devices 101, 102, and 103 are hardware, the terminal devices may be various electronic devices, including but not limited to a smart phone, a tablet computer, an ebook reader, an in-vehicle computer, a laptop portable computer, a desktop computer, and the like. When the terminal devices 101, 102, and 103 are software, the terminal devices may be installed in the above-listed electronic devices, or may be implemented as a plurality of software programs or software modules (e.g., software programs or software modules for providing distributed services), or may be implemented as a single software program or software module. This is not specifically limited here.

The server 105 may be a server that provides various services, such as a back-end server for processing information sent from the terminal devices 101, 102, and 103. The back-end server can recognize an entity in a text sent from a terminal, and associate the entity with an entity in a knowledge base. The executing body can further return an entity linking result to the terminal devices 101, 102, and 103.

It should be noted that the server 105 may be hardware, or may be software. When the server 105 is hardware, the server may be implemented as a distributed server cluster composed of a plurality of servers, or may be implemented as a single server. When the server 105 is software, the server may be implemented as a plurality of software programs or software modules (e.g., software programs or software modules for providing distributed services), or may be implemented as a single software program or software module. This is not specifically limited here.

It should be noted that the method for entity linking provided in the embodiment of the present disclosure is generally executed by the server 105. Accordingly, the apparatus for entity linking is also generally provided in the server 105.

It should be understood that the numbers of terminal devices, networks, and servers in FIG. 1 are merely illustrative. Any number of terminal devices, networks, and servers may be provided based on actual requirements.

Figure 2:
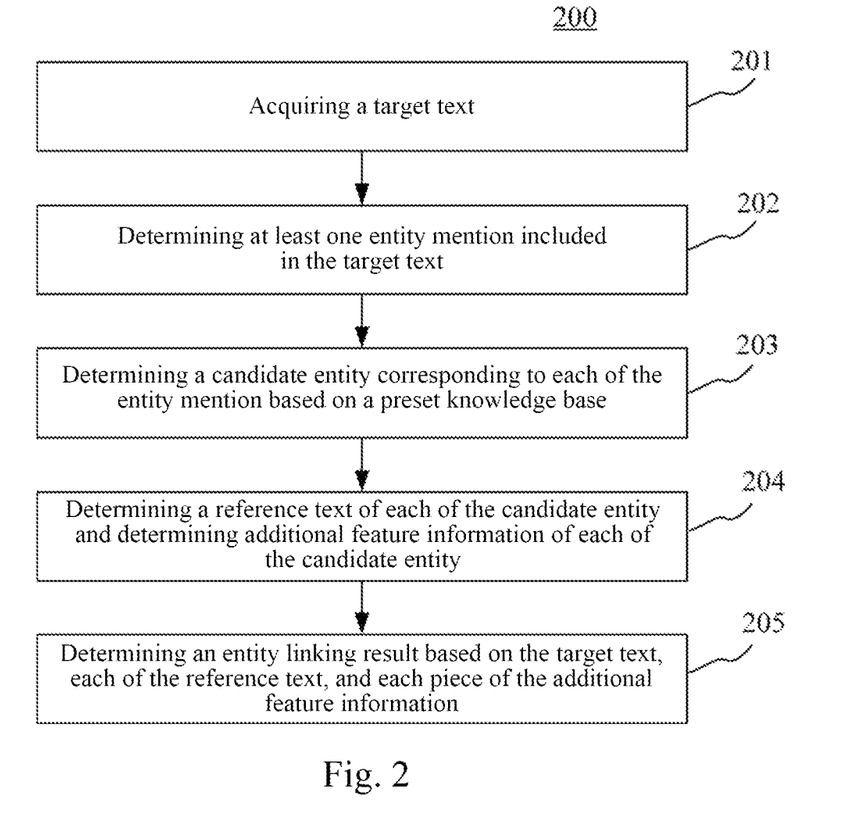
FIG. 2 is a flowchart of a method for entity linking according to an embodiment of the present disclosure.

Further referring to FIG. 2, a process 200 of a method for entity linking according to an embodiment of the present disclosure is shown. The method for entity linking of the present embodiment includes the following steps:

Step 201: acquiring a target text.

In the present embodiment, an executing body (e.g., the server 105 shown in FIG. 1) of the method for entity linking may acquire the target text through wired connection or wireless connection. The target text may be a text inputted by a user through a terminal. The target text may be a to-be-retrieved sentence, and may include at least one entity mention. For example, the target text may be "Where is better to go this summer."

Step 202: determining at least one entity mention included in the target text.

After acquiring the target text, the executing body may perform various processing on the target text to determine at least one entity mention included in the target text. For example, the executing body can perform word segmentation on the target text, and use an obtained noun as an entity mention. Alternatively, the executing body may perform named entity recognition on the target text, and use an obtained named entity as an entity mention. Here, the entity mention refers to a textual representation form of an entity, and may be a named entity, a common noun phrase, or a pronoun. For example, for an entity "Fudan University," its entity mention may include "Fudan University," "Fudan," "Dan University," and the like.

Step 203: determining a candidate entity corresponding to each of the entity mention based on a preset knowledge base.

The executing body can be connected to at least one preset knowledge base, and the above knowledge base includes abundant semantic information of the text. The above knowledge base may include an English knowledge base TAP, Wikipedia, Freebase, YAGO, a Chinese knowledge base Baidu Baike, Hudong Baike, Chinese Wikipedia, and the like. The executing body can find a candidate entity corresponding to each of the entity mention from the above knowledge base. Here, the candidate entity is an entity that exists in the knowledge base and is associated with the entity mention. A name of the candidate entity may be the same as a name of the entity mention, or may be another name of the entity mention. For example, for an entity mention "summer," its corresponding candidate entity may include a movie Summer (a German love movie on show in 2008), a song Summer (written by Ronghao Lee, and released in July 2010), and a season summer (the second season of the four seasons).

Step 204: determining a reference text of each of the candidate entity and determining additional feature information of each of the candidate entity.

After obtaining each of the candidate entity corresponding to each entity mention, the executing body can determine the reference text and the additional feature information of each of the candidate entity. Here, the reference text may be a description text related to description of the candidate entity, e.g., may include description of senses of a dictionary entry of the candidate entity in the knowledge base, an abstract, and the like. The additional feature information may also be referred to as an artificial feature, which may include an entity embedding vector of the candidate entity, an upperseat concept of the candidate entity, and a probability corresponding to the upperseat concept. Such additional feature information may be obtained by a preset processing model. For example, the entity embedding vector may be obtained by a language model (LM), or by a Bi-LSTM (bi-directional long short-term memory obtained by combining a forward LSTM with a backward LSTM).

Step 205: determining an entity linking result based on the target text, each of the reference text, and each piece of the additional feature information.

After obtaining each of the reference text and each piece of the additional feature information, the executing body can disambiguate each of the candidate entity based on the target text, to obtain the entity linking result. Specifically, the executing body can splice the above information, input a spliced text into a preset model to obtain a probability that each of the candidate entity is associated with the entity mention in the target text, and use a candidate entity corresponding to a maximum probability as the entity linking result.

Figure 3:
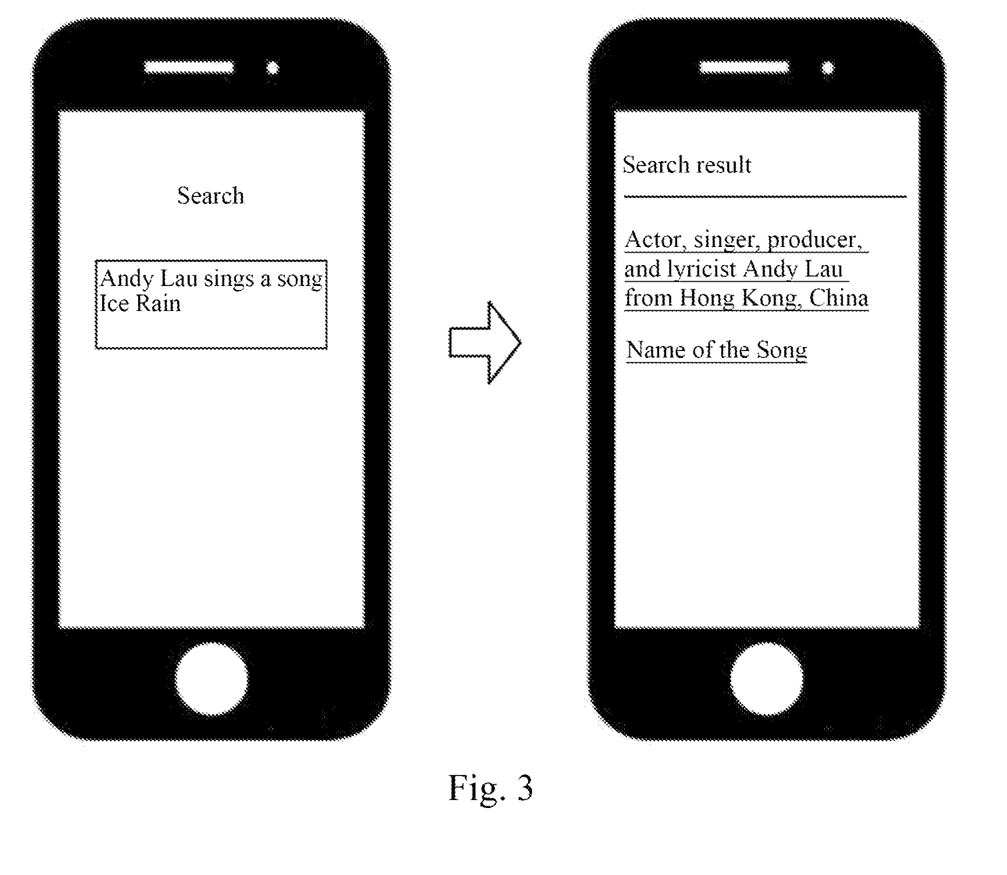
FIG. 3 is a schematic diagram of an application scenario of the method for entity linking according to the present disclosure.

FIG. 3 shows a schematic diagram of an application scenario of the method for entity linking according to the present disclosure. In the application scenario of FIG. 3, a user inputs a sentence that "Andy Lau sings a song Ice Rain" through a search application in a terminal 301. After receiving the inputted sentence, a server 302 obtains entity mentions of "Andy Lau" and "Ice Rain." Since there is a plurality of entities named Andy Lau in a knowledge base, the server 302 disambiguates these entities, and determines that "the actor, singer, producer, and lyricist Andy Lau from Hong Kong, China" is the correct entity.

The method for entity linking provided in the above embodiments of the present disclosure acquires a reference text and additional feature information of a candidate entity during entity disambiguation, thereby giving full play to the driving effect of external knowledge, and improving the accuracy rate of the entity linking result.

Figure 4:
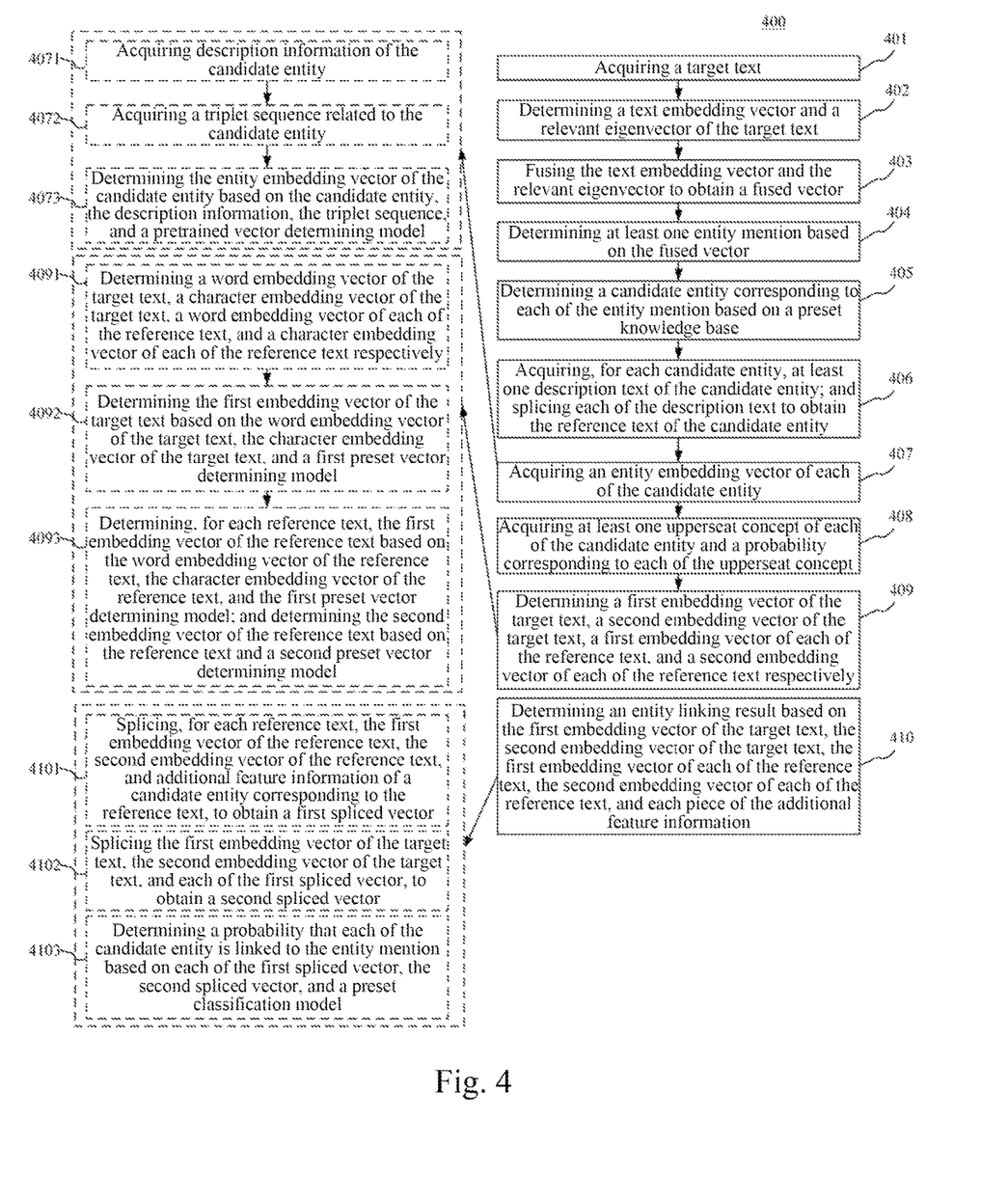
FIG. 4 is a flowchart of the method for entity linking according to another embodiment of the present disclosure.

Further referring to FIG. 4, a process 400 of the method for entity linking according to another embodiment of the present disclosure is shown. As show in FIG. 4, the method for entity linking of the present embodiment may include the following steps:

Step 401: acquiring a target text.

Step 402: determining a text embedding vector and a relevant eigenvector of the target text.

In the present embodiment, the executing body can input the target text into a pretrained language model to obtain the text embedding vector. The language model may be a plurality of existing language models, e.g., Bert (Bidirectional Encoder Representation from Transformers), and Ernie (Ernie is built based on a deep learning framework paddle of Baidu). The executing body can further determine the relevant eigenvector of the target text. The relevant eigenvector may be a part-of-speech eigenvector of the target text, or an entity probability eigenvector. The part-of-speech eigenvector is used for characterizing a part-of-speech of each word in the target text. For example, the target text is that "Andy Lau sings a song Ice Rain," and the part-of-speech eigenvector may be "nr nr nr v v n n n n." nr denotes a person's name, v denotes a verb, and n denotes a noun. The entity probability eigenvector is used for denoting a probability that each word in the target text belongs to an entity. Still taking the above target text as an example, the corresponding entity probability eigenvector may be "0.92 0.92 0.92 0.01 0.01 0.73 0.73 0.88 0.88".

Step 403: fusing the text embedding vector and the relevant eigenvector to obtain a fused vector.

After obtaining the text embedding vector and the relevant eigenvector, the executing body can fuse the text embedding vector and the relevant eigenvector to obtain the fused vector. Specifically, the executing body may fuse the text embedding vector and the relevant eigenvector by various approaches. For example, the executing body may connect the text embedding vector and the relevant eigenvector through a concat function. Alternatively, the executing body may also fuse the text embedding vector and the relevant eigenvector through a pooling layer.

Step 404: determining at least one entity mention based on the fused vector.

After obtaining the fused vector, the executing body can determine at least one entity mention. Specifically, the executing body can input the fused vector into a classification function to obtain the at least one entity mention. The classification function may be a softmax function or a sigmod function. The executing body can determine the at least one entity mention based on the classification result.

In some alternative implementations of the present embodiment, the above step 404 may be implemented through the following steps that are not shown in FIG. 4: performing attention enhancement on the fused vector to obtain an enhanced vector; classifying the enhanced vector twice to obtain a head position and a tail position of each of the entity mention; and determining each of the entity mention based on the obtained head position and the obtained tail position.

In the present implementation, the executing body can perform attention enhancement on the fused vector to obtain the enhanced vector. The executing body can implement attention enhancement on the fused vector using an attention mechanism. The attention mechanism is a problem-solving method presented by imitating human attention, and simply means to quickly select high-value information from a large amount of information. Then, the executing body can classify the enhanced vector twice through the sigmod function. The sigmod function can realize half-pointer and half-annotation, i.e., annotating the head position and the tail position of each of the entity mention respectively. The executing body can obtain each of the entity mention based on the head position and the tail position of each of the entity mention.

In some alternative implementations of the present embodiment, after obtaining the fused vector, and before performing attention enhancement on the fused vector, the executing body can perform dimensionality reduction on the fused vector to obtain a low-dimensional fused vector, and then perform attention enhancement on the low-dimensional fused vector.

Figure 5:
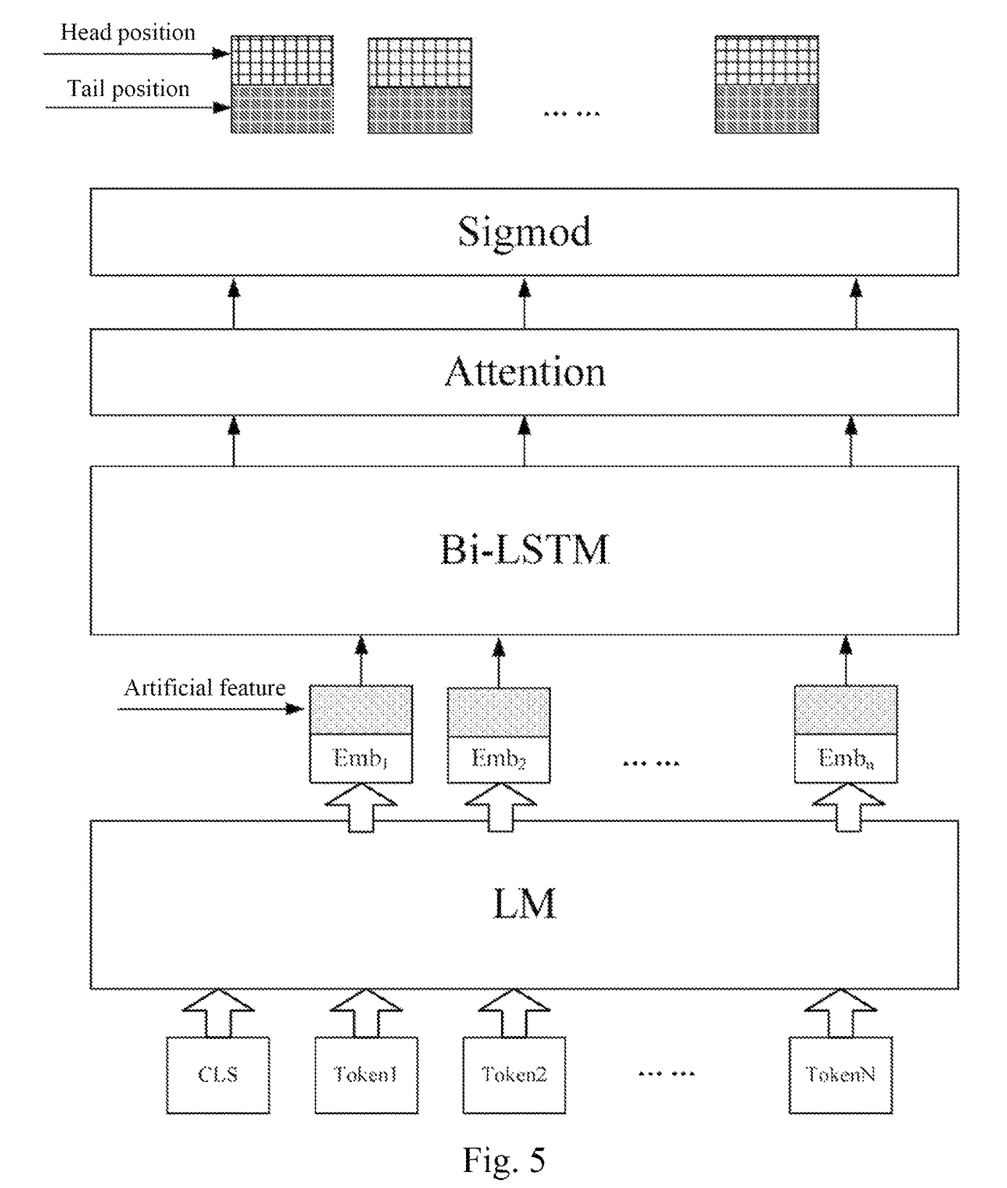
FIG. 5 is a schematic structural diagram of an entity recognition network in the embodiment shown in FIG. 4.

In a specific application, the executing body can recognize the entity mention in the target text through an entity recognition network shown in FIG. 5. As shown in FIG. 5, the entity recognition network may include a LM, a Bi-LSTM, an attention layer, and a Sigmod layer. The target text is inputted into the LM, to obtain the text embedding vector. In the figure, CLS is used for annotating an initial character, and token is each word in the target text. The text embedding vector includes an embedding vector of each word ($Emb_1$, $Emb_2$, . . . $Emb_n$ in FIG. 5). Then, the embedding vector of each word in the text embedding vector is fused with a relevant eigenvector (artificial feature, a gray box in FIG. 5) to obtain the fused vector. The low-dimensional fused vector is obtained after the fused vector is processed through the Bi-LSTM. Attention enhancement on the low-dimensional fused vector is performed through the attention layer. Finally, the low-dimensional fused vector is classified twice through the Sigmod layer to obtain a head position of the entity and a tail position of the entity (in FIG. 5, a white box is the head position, while a gray box is the tail position in an output result of the Sigmod layer).

Step 405: determining a candidate entity corresponding to each of the entity mention based on a preset knowledge base.

Step 406: acquiring, for each candidate entity, at least one description text of the candidate entity; and splicing each of the description text to obtain the reference text of the candidate entity.

In the present embodiment, the executing body can acquire the at least one description text of each candidate entity from the knowledge base. The description text may be description of senses of a dictionary entry of each of the candidate entity, an abstract, and the like. In encyclopedia polysemes, a narrative content of each thing with different concepts and meanings is referred to as the senses of a dictionary entry. Each senses of a dictionary entry has its own separate senses name, senses description, encyclopedia namecard, abstract, text, reference materials, and the like. The executing body can splice obtained information, and use an obtained text as the reference text.

Step 407: acquiring an entity embedding vector of each of the candidate entity.

In the present embodiment, the additional feature information may include the entity embedding vector. For each candidate entity, the executing body can specifically determine the entity embedding vector of the candidate entity through the following steps.

Step 4071: acquiring description information of the candidate entity.

In the present embodiment, the executing body can first acquire description information of the candidate entity. The description information may be information used for describing the candidate entity and acquired by the executing body in any manner. For example, the executing body may acquire the description information from the knowledge base, or may acquire the description information from a search engine. The description information here may be the same as or different from the description text in step 406.

Step 4072: acquiring a triplet sequence related to the candidate entity.

The executing body can further acquire the triplet sequence related to the candidate entity. Specifically, the executing body can acquire the triplet sequence from the knowledge graph. The triplet sequence may include a plurality of triplets, and each of the triplets may be expressed as subject-predicate-object, e.g., Mr. Zhang-starring-Long March.

Step 4073: determining the entity embedding vector of the candidate entity based on the candidate entity, the description information, the triplet sequence, and a pretrained vector determining model.

Figure 6:
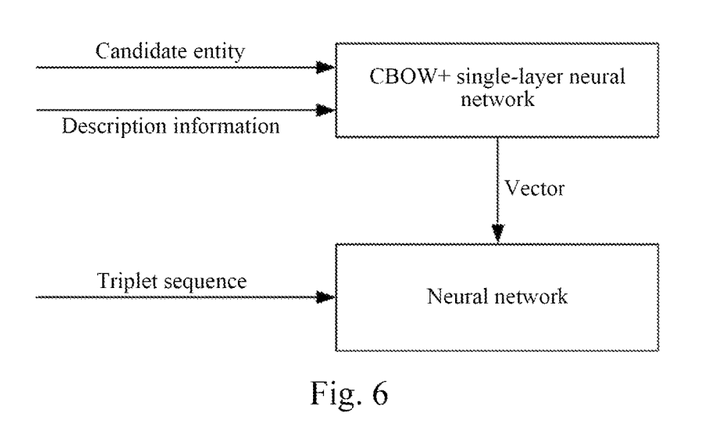
FIG. 6 is a schematic structural diagram of a vector determining model in the embodiment shown in FIG. 4.

After acquiring the description information and the triplet sequences, the executing body can determine the entity embedding vector of the candidate entity based on the candidate entity, and the pretrained vector determining model. The pretrained vector determining model may include two portions denoted as a first determining submodel and a second determining submodel (as shown in FIG. 6) respectively. In FIG. 6, the first determining submodule may include a CBOW (continuous bag of words) and a single-layer neural network. The second determining submodel may include a neural network. The executing body can input the candidate entity and the description information into the first determining submodel, and the first determining submodel outputs a vector. Then, the executing body inputs the vector and the triplet sequence into the second determining submodel to obtain the entity embedding vector.

Since the external knowledge information of each candidate entity is additionally provided, both the first determining submodel and the second determining submodel can learn the above external knowledge, such that the obtained entity embedding vector contains more accurate information.

Step 408: acquiring at least one upperseat concept of each of the candidate entity and a probability corresponding to each of the upperseat concept.

In the present embodiment, the executing body can further acquire the at least one uppereast concept corresponding to each of the candidate entity and the probability corresponding to each of the uppereast concept. Specifically, each of the uppereast concept may be acquired through a preset concept probability predicting model. The concept probability predicting model can predict, based on a text inputted thereinto and a relationship between entities, concepts, and indicator words in a knowledge base, an upperseat concept of the inputted text, which is denoted as a predicted upperseat concept. The executing body can compute a similarity between the predicted upperseat concept and an existing concept in the knowledge base, and use the similarity as the probability corresponding to each of the upperseat concept.

In a specific application, the above step 408 may be implemented by a concept probability predicting model based on random walk with restart. The concept probability predicting model based on random walk with restart can generalize, for a given text, a fine-grained upperseat concept of an entity that best matches a context of the given text based on an instruction in the knowledge base. For example, a candidate entity is "Andy Lau," and its upperseat concept may be a "singer" or an "actor." In a text that "Andy Lau acts in A World Without Thieves," its upperseat concept is an actor. In a text that "Andy Lau sings a song Ice Rain", its upperseat concept is a "singer."

Step 409: determining a first embedding vector of the target text, a second embedding vector of the target text, a first embedding vector of each of the reference text, and a second embedding vector of each of the reference text respectively.

The executing body can further determine a first embedding vector of the target text, a second embedding vector of the target text, a first embedding vector of each of the reference text, and a second embedding vector of each of the reference text. The first embedding vector and the second embedding vector may be embedding vectors obtained by different approaches. For example, the first embedding vector may be an embedding vector obtained by the LM, while the second embedding vector may be an embedding vector obtained by the Bi-LSTM.

In some alternative implementations of the present embodiment, the executing body can implement the above step 409 through the following steps.

Step 4091: determining a word embedding vector of the target text, a character embedding vector of the target text, a word embedding vector of each of the reference text, and a character embedding vector of each of the reference text respectively.

In the present implementation, the executing body may first determine the word embedding vector of the target text, the character embedding vector of the target text, the word embedding vector of each of the reference text, and the character embedding vector of each of the reference text. The word embedding vector includes an embedding vector of each word in a text, and the character embedding vector includes an embedding vector of each character in a text. Specifically, the executing body may determine the word embedding vector through a pretrained word embedding vector determining model. Similarly, the executing body may further determine the character embedding vector through a pretrained character embedding vector determining model. The character embedding vector determining model may be Word2vec, and the character embedding vector determining model may be char2vec. Specifically, the executing body can input the target text and each of the reference text into Word2vec and char2vec, respectively, to obtain the word embedding vector and the character embedding vector.

Step 4092: determining the first embedding vector of the target text based on the word embedding vector of the target text, the character embedding vector of the target text, and a first preset vector determining model.

The executing body can input the word embedding vector of the target text and the character embedding vector of the target text into the first preset vector determining model, to determine the first embedding vector of the target text. The first preset vector determining model may be the Bi-LSTM.

Step 4092: determining the second embedding vector of the target text based on the target text and a second preset vector determining model.

The executing body can further determine the second embedding vector of the target text based on the target text and the second preset vector determining model. The second preset vector determining model may be the LM.

Step 4093: determining, for each reference text, the first embedding vector of the reference text based on the word embedding vector of the reference text, the character embedding vector of the reference text, and the first preset vector determining model; and determining the second embedding vector of the reference text based on the reference text and the second preset vector determining model.

Likewise, for each reference text, the executing body can input the word embedding vector of the reference text and the character embedding vector of the reference text into the first preset vector determining model, to obtain the first embedding vector of the reference text. The executing body can input the reference text into the second preset vector determining model to obtain the second embedding vector of the reference text.

Step 410: determining an entity linking result based on the first embedding vector of the target text, the second embedding vector of the target text, the first embedding vector of each of the reference text, the second embedding vector of each of the reference text, and each piece of the additional feature information.

The executing body can determine the entity linking result after obtaining the first embedding vector of the target text, the second embedding vector of the target text, the first embedding vector of each of the reference text, the second embedding vector of each of the reference text, and the additional feature information of each of the candidate entity. Here, the entity linking result refers to a linking relationship between the entity mention in the target text and the candidate entity. Specifically, the executing body can splice the first embedding vector of the target text and the second embedding vector of the target text, splice the first embedding vector of each of the reference text, the second embedding vector of each of the reference text, and corresponding additional feature information, and input spliced information into a classification layer to obtain the entity linking result.

In some alternative implementations of the present embodiment, the executing body can pool the obtained plurality of first embedding vectors and the obtained plurality of second embedding vectors, to reduce dimensionality of each of the first embedding vectors and dimensionality of each of the second embedding vectors.

In some alternative implementations of the present embodiment, the executing body can implement step 410 through the following steps.

Step 4101: splicing, for each reference text, the first embedding vector of the reference text, the second embedding vector of the reference text, and additional feature information of a candidate entity corresponding to the reference text, to obtain a first spliced vector.

In the present implementation, since there is a corresponding relationship between the candidate entity and the additional feature information, there is also a corresponding relationship between the candidate entity and the reference text. Then, there is also a corresponding relationship between the additional feature information and the reference text. For each reference text, the executing body splices the first embedding vector of the reference text, the second embedding vector of the reference text, and the corresponding additional feature information, to obtain the first spliced vector. That is, each candidate entity can obtain the first spliced vector.

Step 4102: splicing the first embedding vector of the target text, the second embedding vector of the target text, and each of the first spliced vector, to obtain a second spliced vector.

After obtaining the first spliced vector of each of the candidate entity, for the target text, the executing body can splice the first embedding vector of the target text and the second embedding vector of the target text, and then splice the spliced embedding vector and each of the first spliced vector, to obtain the second spliced vector.

Step 4103: determining a probability of linking each of the candidate entity to the entity mention based on each of the first spliced vector, the second spliced vector, and a preset classification model.

After obtaining each of the first spliced vector and the second spliced vector, the executing body can input each of the first spliced vector and the second spliced vector into the preset classification model, to obtain a classification result. The classification result denotes the linking relationship between the entity mention in the target text and each of the candidate entity. The classification model may be a data processing layer in a neural network, e.g., a softmax layer.

Figure 7:
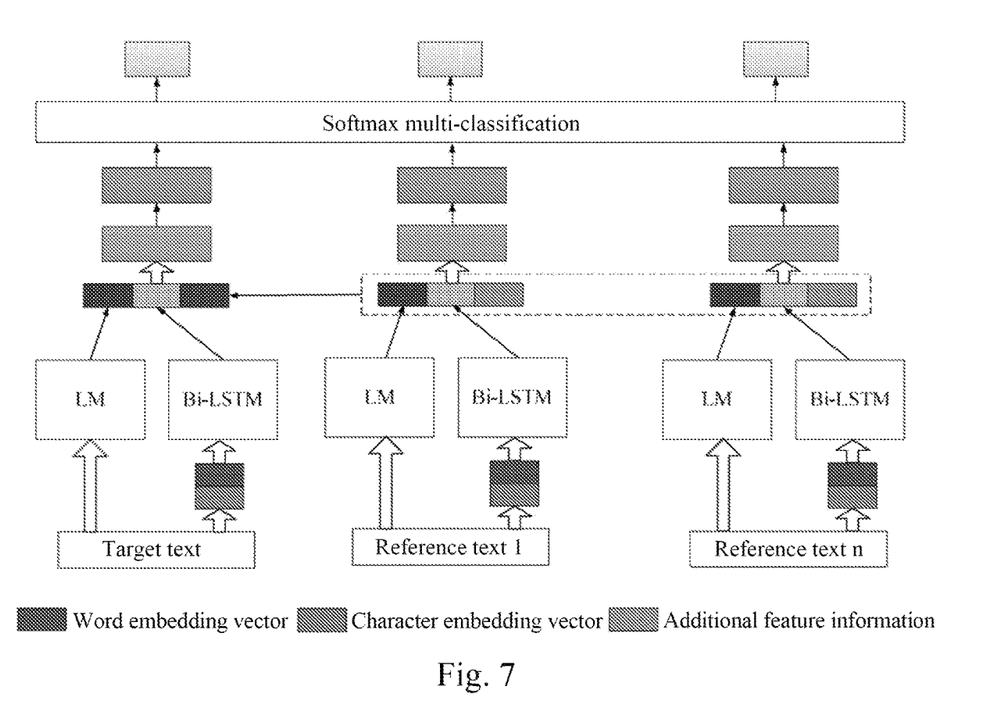
FIG. 7 is a schematic structural diagram of a named entity disambiguation network in the embodiment shown in FIG. 4.

In a specific application, the executing body can disambiguate a recognized entity mention using an entity disambiguation network shown in FIG. 7. In FIG. 7, the network may include a plurality of LMs and a plurality of Bi-LSTMs. A target text may be inputted into the LMs respectively, to obtain a first embedding vector of the target text. Then, a word embedding vector of the target text and a character embedding vector of the target text are inputted into the Bi-LSTMs, to obtain a second embedding vector of the target text. Likewise, for each reference text, the executing body can input the reference text into the LMs, to obtain a first embedding vector of the reference text. Then, a word embedding vector of the reference text and a character embedding vector of the reference text are inputted into the Bi-LSTMs, to obtain a second embedding vector of the reference text.

After the first embedding vector of the reference text and the second embedding vector of the reference text are pooled, the pooled first embedding vector and the pooled second embedding vector may be spliced, and then additional feature information of a candidate entity corresponding to the reference text may be spliced into the spliced vector, to obtain a first spliced vector. After pooling the first embedding vector of the target text and the second embedding vector of the target text, the executing body can splice the pooled first embedding vector and the pooled second embedding vector, and then splice each of the first spliced vector to the pooled first embedding vector and the pooled second embedding vector, to obtain a second spliced vector.

The executing body can further input the first spliced vector and the second spliced vector into a Dropout layer respectively, and the Dropout layer may discard a certain proportion of neural units in the network, to prevent overfitting. Then a Dense layer is entered. The Dense layer is a fully connected layer, which functions to connect local features through a weight matrix. Finally, information outputted from the Dense layer may be inputted into a softmax multi-classification layer. An output of the softmax multi-classification layer is a value between 0 and 1 for denoting a probability of association between each candidate entity and the entity mention. According to the above probability, a linking relationship between the entity mention and each candidate entity is obtained.

The method for entity linking provided in the above embodiments of the present disclosure implements end-to-end entity linking through an entity recognition network and an entity disambiguation network, and introduces external knowledge during entity recognition and entity disambiguation, thereby improving the driving effect of external knowledge, and improving the accuracy rate of entity linking.

In some alternative implementations of the present embodiment, the entity recognition network shown in FIG. 5 and the entity disambiguation network shown in FIG. 7 may be jointly trained, i.e., trained by adding a loss function of the entity recognition network and a loss function of the entity disambiguation network together, and optimizing network parameters during training, thus achieving end-to-end training.

Figure 8:
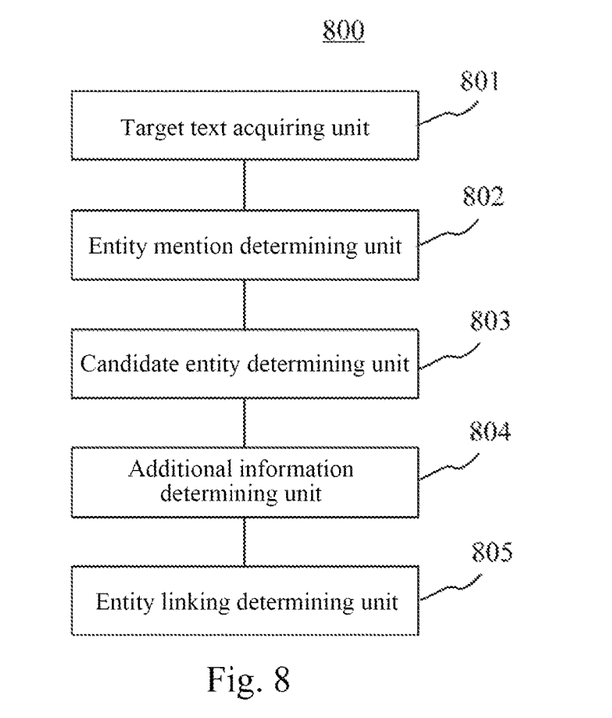
FIG. 8 is a schematic structural diagram of an apparatus for entity linking according to an embodiment of the present disclosure.

Further referring to FIG. 8, as an implementation of the method shown in the above figures, an embodiment of the present disclosure provides an apparatus for outputting information. The embodiment of the apparatus corresponds to the embodiment of the method shown in FIG. 2. The apparatus may be specifically applied to various electronic devices.

As shown in FIG. 8, an apparatus 800 for entity linking of the present embodiment includes: a target text acquiring unit 801, an entity mention determining unit 802, a candidate entity determining unit 803, an additional information determining unit 804, and an entity linking determining unit 805.

The target text acquiring unit 801 is configured to acquire a target text.

The entity mention determining unit 802 is configured to determine at least one entity mention included in the target text.

The candidate entity determining unit 803 is configured to determine a candidate entity corresponding to each of the entity mention based on a preset knowledge base.

The additional information determining unit 804 is configured to determine a reference text of each of the candidate entity and determine additional feature information of each of the candidate entity.

The entity linking determining unit 805 is configured to determine an entity linking result based on the target text, each of the reference text, and each piece of the additional feature information.

In some alternative implementations of the present embodiment, the entity mention determining unit 802 may further include: a vector determining module, a vector fusing module, and an entity mention determining module that are not shown in FIG. 8.

The vector determining module is configured to determine a text embedding vector and a relevant eigenvector of the target text.

The vector fusing module is configured to fuse the text embedding vector and the relevant eigenvector to obtain a fused vector.

The entity mention determining module is configured to determine the at least one entity mention based on the fused vector.

In some alternative implementations of the present embodiment, the entity mention determining module may be further configured to: perform attention enhancement on the fused vector to obtain an enhanced vector; classify the enhanced vector twice to obtain a head position and a tail position of each of the entity mention; and determine each of the entity mention based on the obtained head position and the obtained tail position.

In some alternative implementations of the present embodiment, the additional information determining unit 804 may further include a reference text determining module that is not shown in FIG. 8, and is configured to: acquire, for each candidate entity, at least one description text of the candidate entity; and splice each of the description text to obtain the reference text of the candidate entity.

In some alternative implementations of the present embodiment, the additional feature information includes an entity embedding vector. The additional information determining unit 804 may further include an entity embedding vector determining module that is not shown in FIG. 8, and is configured to: acquire, for each candidate entity, description information of the candidate entity; acquire a triplet sequence related to the candidate entity; and determine the entity embedding vector of the candidate entity based on the candidate entity, the description information, the triplet sequence, and a pretrained vector determining model.

In some alternative implementations of the present embodiment, the additional feature information includes at least one upperseat concept and a probability corresponding to each of the upperseat concept. The additional information determining unit 804 may further include a concept predicting module that is not shown in FIG. 8, and is configured to: determine, for each candidate entity, at least one upperseat concept of the candidate entity and the probability corresponding to each of the upperseat concept based on the candidate entity and a preset concept predicting model, to obtain a probability sequence.

In some alternative implementations of the present embodiment, the entity linking determining unit 805 may further include: an embedding vector determining module and an entity linking determining module that are not shown in FIG. 8.

The embedding vector determining module is configured to determine a first embedding vector of the target text, a second embedding vector of the target text, a first embedding vector of each of the reference text, and a second embedding vector of each of the reference text respectively.

The entity linking determining module is configured to determine the entity linking result based on the first embedding vector of the target text, the second embedding vector of the target text, the first embedding vector of each of the reference text, the second embedding vector of each of the reference text, and each piece of the additional feature information.

In some alternative implementations of the present embodiment, the embedding vector determining module is further configured to: determine a word embedding vector of the target text, a character embedding vector of the target text, a word embedding vector of each of the reference text, and a character embedding vector of each of the reference text respectively; determine the first embedding vector of the target text based on the word embedding vector of the target text, the character embedding vector of the target text, and a first preset vector determining model; determine the second embedding vector of the target text based on the target text and a second preset vector determining model; and determine, for each reference text, the first embedding vector of the reference text based on the word embedding vector of the reference text, the character embedding vector of the reference text, and the first preset vector determining model; and determine the second embedding vector of the reference text based on the reference text and the second preset vector determining model.

In some alternative implementations of the present embodiment, the entity linking determining module is further configured to: splice, for each reference text, the first embedding vector of the reference text, the second embedding vector of the reference text, and additional feature information of a candidate entity corresponding to the reference text, to obtain a first spliced vector; splice the first embedding vector of the target text, the second embedding vector of the target text, and each of the first spliced vector, to obtain a second spliced vector; and determine a probability of linking each of the candidate entity to the entity mention based on each of the first spliced vector, the second spliced vector, and a preset classification model.

It should be understood that the disclosed unit 801 to unit 805 in the apparatus 800 for entity linking correspond to the steps in the method described in FIG. 2 respectively. Therefore, the operations and features described above for the method for entity linking also apply to the apparatus 800 and the units included therein. The description will not be repeated here.

According to an embodiment of the present disclosure, the present disclosure further provides an electronic device and a readable storage medium.

Figure 9:
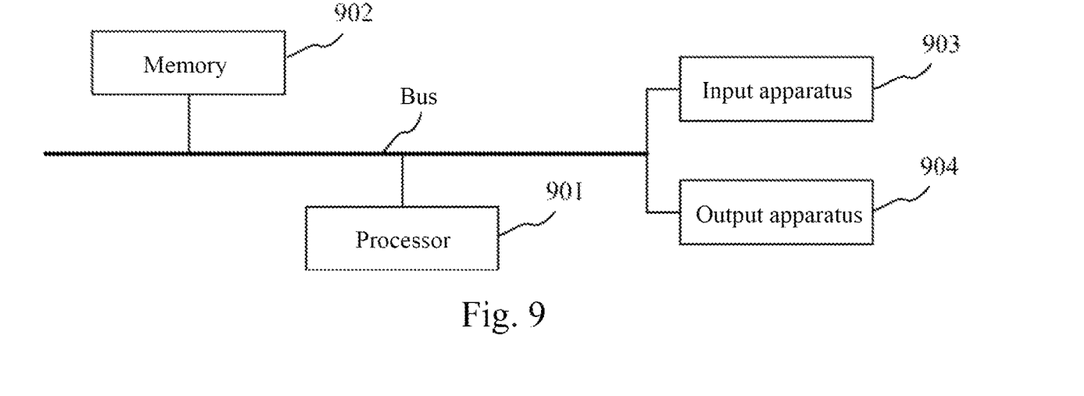
FIG. 9 is a block diagram of an electronic device configured to implement the method for entity linking of embodiments of the present disclosure.

As shown in FIG. 9, a block diagram of an electronic device configured to implement the method for entity linking according to embodiments of the present disclosure is shown. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 9, the electronic device includes: one or more processors 901, a memory 902, and interfaces for connecting various components, including a high-speed interface and a low-speed interface. The various components are interconnected using different buses, and may be mounted on a common motherboard or in other manners as required. The processor can process instructions for execution within the electronic device, including instructions stored in the memory or on the memory to display graphical information for a GUI on an external input/output apparatus (e.g., a display device coupled to an interface). In other implementations, a plurality of processors and/or a plurality of buses may be used, as appropriate, along with a plurality of memories and a plurality of memories. Similarly, a plurality of electronic devices may be connected, with each device providing portions of necessary operations (e.g., as a server array, a group of blade servers, or a multi-processor system). In FIG. 9, a processor 901 is taken as an example.

The memory 902 is a non-transient computer-readable storage medium provided in the present disclosure. The memory stores instructions executable by at least one processor, such that the at least one processor executes the method for entity linking provided in the present disclosure. The non-transient computer-readable storage medium of the present disclosure stores computer instructions. The computer instructions are used for causing a computer to execute the method for entity linking provided in the present disclosure.

As a non-transient computer-readable storage medium, the memory 902 may be configured to store non-transient software programs, non-transient computer-executable programs and modules, such as the program instructions/modules (e.g., the target text acquiring unit 801, the entity mention determining unit 802, the candidate entity determining unit 803, the additional information determining unit 804, and the entity linking determining unit 805 shown in FIG. 8) corresponding to the method for entity linking in embodiments of the present disclosure. The processor 901 runs non-transient software programs, instructions, and modules stored in the memory 902, to execute various function applications and data processing of a server, i.e., implementing the method for entity linking in the above embodiments of the method.

The memory 902 may include a program storage area and a data storage area, where the program storage area may store an operating system and an application program required by at least one function; and the data storage area may store, e.g., data created based on use of the electronic device for outputting information. In addition, the memory 902 may include a high-speed random-access memory, and may further include a non-transient memory, such as at least one magnetic disk storage component, a flash memory component, or other non-transient solid state storage components. In some embodiments, the memory 902 alternatively includes memories disposed remotely relative to the processor 901, and these remote memories may be connected to the electronic device for outputting information via a network. Examples of the above network include, but are not limited to, the Internet, an intranet, a local area network, a mobile communication network, and a combination thereof.

The electronic device of the method for entity linking may further include: an input apparatus 903 and an output apparatus 904. The processor 901, the memory 902, the input apparatus 903, and the output apparatus 904 may be connected through a bus or in other manners. Bus connection is taken as an example in FIG. 9.

The input apparatus 903 can receive inputted number or character information, and generate a key signal input related to user settings and function control of the electronic device for outputting information, e.g., an input apparatus such as a touch screen, a keypad, a mouse, a trackpad, a touchpad, an indicating arm, one or more mouse buttons, a trackball, and a joystick. The output apparatus 904 may include a display device, an auxiliary lighting apparatus (e.g., an LED), a haptic feedback apparatus (e.g., a vibration motor), and the like. The display device may include, but is not limited to, a liquid crystal display (LCD), a light emitting diode (LED) display, and a plasma display. In some implementations, the display device may be a touch screen.

Various implementations of the systems and technologies described herein may be implemented in a digital electronic circuit system, an integrated circuit system, an ASIC (application specific integrated circuit), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output apparatus.

These computing programs (also known as programs, software, software applications, or code) include machine instructions for a programmable processor, and may be implemented in a high-level procedural and/or object-oriented programming language, and/or in an assembly/machine language. As used herein, the terms "machine-readable medium" and "computer-readable medium" refer to any computer program product, device, and/or apparatus (e.g., a magnetic disk, an optical disk, a memory, or a programmable logic device (PLD)) configured to provide machine instructions and/or data to a programmable processor, and include a machine-readable medium receiving machine instructions as machine-readable signals. The term "machine-readable signal" refers to any signal used to provide machine instructions and/or data to a programmable processor.

To provide interaction with a user, the systems and technologies described herein may be implemented on a computer that is provided with: a display apparatus (e.g., a CRT (cathode ray tube) or a LCD (liquid crystal display) monitor) configured to display information to the user); and a keyboard and a pointing apparatus (e.g., a mouse or a trackball) by which the user can provide an input to the computer. Other kinds of apparatus may also be used to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by any form or medium of digital data communication (e.g., a communication network). Examples of the communication network include: a local area network (LAN), a wide area network (WAN), and the Internet.

The computer system may include a client terminal and a server. The client terminal and the server are generally remote from each other, and usually interact through a communication network. The relationship of the client terminal and the server arises by virtue of computer programs that run on corresponding computers and have a client-server relationship with each other.

According to the technical solutions of the embodiments of the present disclosure, a reference text is introduced during pretraining and fine-tuning, to improve an ability of a language model to learn external knowledge, and improve the accuracy rate of understanding of an inputted text; and the inputted text and the reference text are annotated to avoid introducing noise or diluting the inputted text.

It should be understood that the various forms of processes shown above can be used to reorder, add, or delete steps. For example, the steps disclosed in the present disclosure can be executed in parallel, sequentially, or in different orders, as long as the desired results of the technical solutions disclosed in the present disclosure can be achieved. This is not limited herein.

The above specific implementations do not constitute a limitation to the protection scope of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be included within the protection scope of the present disclosure.

What is claimed is:

1. A method for entity linking, comprising:
acquiring a target text;
determining at least one entity mention included in the target text;
determining a candidate entity corresponding to each of the entity mention based on a preset knowledge base;
determining a reference text of each of the candidate entity and determining additional feature information of each of the candidate entity; and
determining an entity linking result based on the target text, each of the reference text, and each piece of the additional feature information,
wherein the determining the entity linking result based on the target text, each of the reference text, and each piece of the additional feature information comprises:
determining a first embedding vector of the target text, a second embedding vector of the target text, a first embedding vector of each of the reference text, and a second embedding vector of each of the reference text respectively;
splicing, for each reference text, the first embedding vector of the reference text, the second embedding vector of the reference text, and additional feature information of a candidate entity corresponding to the reference text, to obtain a first spliced vector;
splicing the first embedding vector of the target text, the second embedding vector of the target text, and each of the first spliced vector, to obtain a second spliced vector; and
determining a probability of linking each of the candidate entity to the entity mention based on each of the first spliced vector, the second spliced vector, and a preset classification model.

2. The method according to claim 1, wherein the determining the at least one entity mention included in the target text comprises:
determining a text embedding vector and a relevant eigenvector of the target text;
fusing the text embedding vector and the relevant eigenvector to obtain a fused vector; and
determining the at least one entity mention based on the fused vector.

3. The method according to claim 2, wherein the determining the at least one entity mention based on the fused vector comprises:

performing attention enhancement on the fused vector to obtain an enhanced vector;

classifying the enhanced vector twice to obtain a head position and a tail position of each of the entity mention; and determining each of the entity mention based on the obtained head position and the obtained tail position.

4. The method according to claim 1, wherein the determining the reference text of each of the candidate entity comprises:

acquiring, for each candidate entity, at least one description text of the candidate entity; and splicing each of the description text to obtain the reference text of the candidate entity.

5. The method according to claim 1, wherein the additional feature information comprises an entity embedding vector; and the determining the additional feature information of each of the candidate entity comprises:

acquiring, for each candidate entity, description information of the candidate entity;

acquiring a triplet sequence related to the candidate entity; and determining the entity embedding vector of the candidate entity based on the candidate entity, the description information, the triplet sequence, and a pretrained vector determining model.

6. The method according to claim 1, wherein the additional feature information comprises at least one upperseat concept and a probability corresponding to each of the upperseat concept; and the determining the additional feature information of each of the candidate entity comprises:

determining, for each candidate entity, at least one upperseat concept of the candidate entity and the probability corresponding to each of the upperseat concept based on the candidate entity and a preset concept predicting model, to obtain a probability sequence.

7. The method according to claim 1, wherein the determining the first embedding vector of the target text, the second embedding vector of the target text, the first embedding vector of each of the reference text, and the second embedding vector of each of the reference text comprises:

determining a word embedding vector of the target text, a character embedding vector of the target text, a word embedding vector of each of the reference text, and a character embedding vector of each of the reference text respectively;

determining the first embedding vector of the target text based on the word embedding vector of the target text, the character embedding vector of the target text, and a first preset vector determining model;

determining the second embedding vector of the target text based on the target text and a second preset vector determining model; and determining, for each reference text, the first embedding vector of the reference text based on the word embedding vector of the reference text, the character embedding vector of the reference text, and the first preset vector determining model; and determining the second embedding vector of the reference text based on the reference text and the second preset vector determining model.

8. An electronic device, comprising:

at least one processor; and a memory communicatively connected to the at least one processor, wherein:

the memory stores instructions executable by the at least one processor, and the instructions are executed by the at least one processor, such that the at least one processor can perform operations comprising:

acquiring a target text;

determining at least one entity mention included in the target text;

determining a candidate entity corresponding to each of the entity mention based on a preset knowledge base;

determining a reference text of each of the candidate entity and determining additional feature information of each of the candidate entity; and determining an entity linking result based on the target text, each of the reference text, and each piece of the additional feature information, wherein the determining the entity linking result based on the target text, each of the reference text, and each piece of the additional feature information comprises:

determining a first embedding vector of the target text, a second embedding vector of the target text, a first embedding vector of each of the reference text, and a second embedding vector of each of the reference text respectively;

splicing, for each reference text, the first embedding vector of the reference text, the second embedding vector of the reference text, and additional feature information of a candidate entity corresponding to the reference text, to obtain a first spliced vector;

splicing the first embedding vector of the target text, the second embedding vector of the target text, and each of the first spliced vector, to obtain a second spliced vector; and determining a probability of linking each of the candidate entity to the entity mention based on each of the first spliced vector, the second spliced vector, and a preset classification model.

9. The electronic device according to claim 8, wherein the determining the at least one entity mention included in the target text comprises:

determining a text embedding vector and a relevant eigenvector of the target text;

fusing the text embedding vector and the relevant eigenvector to obtain a fused vector; and determining the at least one entity mention based on the fused vector.

10. The electronic device according to claim 9, wherein the determining the at least one entity mention based on the fused vector comprises:

performing attention enhancement on the fused vector to obtain an enhanced vector;

classifying the enhanced vector twice to obtain a head position and a tail position of each of the entity mention; and determining each of the entity mention based on the obtained head position and the obtained tail position.

11. The electronic device according to claim 8, wherein the determining the reference text of each of the candidate entity comprises:

acquiring, for each candidate entity, at least one description text of the candidate entity; and splicing each of the description text to obtain the reference text of the candidate entity.

12. The electronic device according to claim 8, wherein the additional feature information comprises an entity embedding vector; and the determining the additional feature information of each of the candidate entity comprises:

acquiring, for each candidate entity, description information of the candidate entity;

acquiring a triplet sequence related to the candidate entity; and determining the entity embedding vector of the candidate entity based on the candidate entity, the description information, the triplet sequence, and a pretrained vector determining model.

13. The electronic device according to claim 8, wherein the additional feature information comprises at least one upperseat concept and a probability corresponding to each of the upperseat concept; and the determining the additional feature information of each of the candidate entity comprises:

determining, for each candidate entity, at least one upperseat concept of the candidate entity and the probability corresponding to each of the upperseat concept based on the candidate entity and a preset concept predicting model, to obtain a probability sequence.

14. The electronic device according to claim 8, wherein the determining the first embedding vector of the target text, the second embedding vector of the target text, the first embedding vector of each of the reference text, and the second embedding vector of each of the reference text comprises:

determining a word embedding vector of the target text, a character embedding vector of the target text, a word embedding vector of each of the reference text, and a character embedding vector of each of the reference text respectively;

determining the first embedding vector of the target text based on the word embedding vector of the target text, the character embedding vector of the target text, and a first preset vector determining model;

determining the second embedding vector of the target text based on the target text and a second preset vector determining model; and determining, for each reference text, the first embedding vector of the reference text based on the word embedding vector of the reference text, the character embedding vector of the reference text, and the first preset vector determining model; and determining the second embedding vector of the reference text based on the reference text and the second preset vector determining model.

15. A non-transient computer-readable storage medium storing computer instructions, the computer instructions, when executed by a computer, causing the computer to perform operations comprising:

acquiring a target text;

determining at least one entity mention included in the target text;

determining a candidate entity corresponding to each of the entity mention based on a preset knowledge base;

determining a reference text of each of the candidate entity and determining additional feature information of each of the candidate entity; and determining an entity linking result based on the target text, each of the reference text, and each piece of the additional feature information;

wherein the determining the entity linking result based on the target text, each of the reference text, and each piece of the additional feature information comprises:

determining a first embedding vector of the target text, a second embedding vector of the target text, a first embedding vector of each of the reference text, and a second embedding vector of each of the reference text respectively;

splicing, for each reference text, the first embedding vector of the reference text, the second embedding vector of the reference text, and additional feature information of a candidate entity corresponding to the reference text, to obtain a first spliced vector;

splicing the first embedding vector of the target text, the second embedding vector of the target text, and each of the first spliced vector, to obtain a second spliced vector; and determining a probability of linking each of the candidate entity to the entity mention based on each of the first spliced vector, the second spliced vector, and a preset classification model.

16. The non-transient computer-readable storage medium according to claim 15, wherein the determining the at least one entity mention included in the target text comprises:

determining a text embedding vector and a relevant eigenvector of the target text;

fusing the text embedding vector and the relevant eigenvector to obtain a fused vector; and determining the at least one entity mention based on the fused vector.

* * * * *